Aug. 15, 1972  D. S. GILBERT  3,684,598

MANUFACTURE OF LAMINATED ARTICLES

Filed July 22, 1968  3 Sheets-Sheet 1

INVENTOR
DAVID STONE GILBERT

BY
Cushman Darby & Cushman
ATTORNEYS

Aug. 15, 1972  D. S. GILBERT  3,684,598
MANUFACTURE OF LAMINATED ARTICLES
Filed July 22, 1968  3 Sheets-Sheet 3

INVENTOR
DAVID STONE GILBERT

BY
Cushman, Darby & Cushman
ATTORNEYS

United States Patent Office 3,684,598
Patented Aug. 15, 1972

3,684,598
MANUFACTURE OF LAMINATED ARTICLES
David Stone Gilbert, Manchester, England, assignor to Imperial Chemical Industries Limited, London, England
Filed July 22, 1968, Ser. No. 749,561
Claims priority, application Great Britain, July 21, 1967, 33,702/67
Int. Cl. B32b 5/18
U.S. Cl. 156—79                               19 Claims

ABSTRACT OF THE DISCLOSURE

Improved process and apparatus for making laminated articles consisting of a plastic or resinous foam core sandwiched between and bonded to two outer sheets of facing material are obtained by bringing the upper and lower facing sheets together, following the application of a foam-forming mixture to one or both sheets but before the rise of the mixture is complete, with the aid of spring mounted resilient contacting means whereby uniform pressure is applied to the upper facing sheet and to the foam layer over their entire width. Preferably the facing sheets are so brought together when only a small degree of foam formation has occurred.

---

This invention relates to the manufacture of laminated articles and more particularly to the continuous manufacture of laminated articles having a plastic or resinous foam core.

It is already known to manufacture laminated articles having a core consisting of a plastic or resinous foam, for example polyurethane foam, one or both surfaces of which are bonded to an outer sheet of facing material. A machine suitable for the continuous manufacture of such laminated articles consists essentially of a conveyor system and a foam dispensing unit. The conveyor system serves to bring the sheets of facing material into the correct disposition and to hold them in this position while the foam core is formed upon or between them. In practice, when two sheets of facing material are used, the sheets are disposed one above the other and at a distance apart equal to the thickness of foam core which is desired in the final laminated article. Before the sheets are brought into this disposition a layer of foam-forming ingredients is applied to the lower of the two sheets by means of the foam dispensing unit. The sheets are then brought into the correct disposition by means of the conveyor system, whereby the foam-forming layer comes into contact with the upper of the two sheets, after which the formation and setting of the foam core is completed, optionally under the accelerating influence of heat.

It has hitherto been customary to bring the upper facing sheet into contact with the upper surface of the layer of foam-forming ingredients by causing the upper sheet, the layer of ingredients and the lower sheet supporting the layer to pass into the nip between a pair of rigid rollers. This arrangement has the disadvantage that if any irregularities are present in the surface of the foam layer, the contact between it and the upper facing may not be uniform and complete over the whole area involved; in other words, it is possible for voids to occur between the foam layer and the facing sheet, and these will be present in the finished laminate with a resulting deleterious effect on its mechanical properties and appearance.

It has now been found that laminated articles of improved properties and appearance are obtained if the upper facing sheet is brought into contact with the layer of foam-forming ingredients by the action of resilient contacting means whereby uniform pressure is applied to the layer over its entire width.

Thus according to the present invention there is provided a process for the continuous manufacture of laminated articles consisting of a core of plastic or resinous foam sandwiched between and bonded to two outer sheets of facing material, the process comprising imparting longitudinal motion to upper and lower facing sheets, applying to the surface of at least one of the said facing sheets whilst it is in motion a liquid mixture of foam-forming ingredients, bringing the upper facing sheet, before the rise of the foam-forming mixture so applied is complete, into proximate relationship with the lower sheet such that both sheets are in contact with the foam-forming mixture and that mixture fully occupies the space between the said sheets, the upper sheet being brought into the said proximate relationship through the agency of resilient contacting means whereby uniform pressure is applied through the upper facing sheet to the layer of foam-forming ingredients over the entire width of the layer, and thereafter simultaneously transporting the upper and lower facing sheets whilst formation and setting of the foam core between them is completed.

The resilient contacting means may take the form of a roller covered with a resilient material, such as a flexible plastic foam, which is mounted parallel to the lower facing sheet and under which the upper facing sheet is caused to pass. Alternatively, the resilient contacting means may take the form of a floating brush which bears against the upper surface of the upper surface of the upper facing sheet. Yet another suitable form of resilient contact means is provided by a resilient metal strip which is mounted transversely to the line of motion of the upper facing sheet in such a way that its lower edge bears against the upper surface of the sheet. Preferably such a metal strip is curved so that its lower part makes tangential contact with the upper facing sheet. Suitable material for constructing this form of resilient contact means is spring steel strip of thickness in the range of 0.005–0.02″. In any event the resilient contacting means extends across the full width of the two facing sheets and is mounted so as to exert a sufficient degree of pressure upon the upper facing sheet to effect the desired contact, this pressure being distributed uniformly across the width of the sheets, notwithstanding any irregularities which there may be in the thickness of the layer of foam-forming ingredients, by virtue of the resilient character of the means employed. Suitable pressure may be exerted upon the upper facing sheet by applying loading, for example by springs or weights, to the resilient contacting means.

It is preferred that the resilient contacting means used should be of such shape and dimensions that, as the facing sheets and the layer of foam-forming ingredients are continuously conveyed together beneath it, the uniform pressure which it exerts on the upper facing sheet and the layer is distributed over an appreciable area thereof rather being confined to a narrow line of contact transverse to the direction of motion of the facing sheets. In this way the pressure to which any given part of the facing sheet and the foam layer is subjected is maintained for a short period of time, for example from 1 to 10 seconds, whereby the advantages conferred by the invention are enhanced. Such extended contact may be achieved, in the case where the resilient contacting means used is a floating brush, by arranging for the operative part of the brush to extend appreciably in the direction of motion of the facing sheets; where the resilient contacting means is a metal strip, the strip may be so shaped that its terminal portion extends to make contact with an appreciable area of the upper facing sheet, or alternatively a pair of such metal strips may be employed mounted parallel to each other, so that their pressure-applying portions are adjacent to one another.

It is preferred that the resilient contacting means should be located in relation to the other parts of the laminating machine in such a way that the upper facing sheet is brought into contact with the foam-forming layer thereby at a stage when the foam-forming reaction in the layer has proceeded to only a small extent, so that the extent to which the layer has expanded when the upper facing sheet is applied is only a small fraction of its total rise. This is achieved by mounting the resilient contacting means at a point posterior to the position at which the layer of foam-forming ingredients is applied to the lower facing sheet but in sufficient proximity thereto so that the layer on reaching that point has undergone only a small degree of foam-formation. Under these circumstances, the greater part of the expansion of the layer takes place in contact with both the upper and the lower facing sheets and the benefits of the invention, in particular absence of void formation, are especially evident.

The resilient contacting means is mounted in such a way that when the upper facing sheet passes beneath it, the two facing sheets are separated by a gap which is of dimensions comparable with the thickness of the layer of foam-forming ingredients at that point. When the invention is operated in the preferred way which has been described above, however, it is found to be desirable, in order to ensure accurate longitudinal location of the upper sheet in relation to the lower sheet, to cause the upper sheet to pass, prior to its passage beneath the resilient contacting means, under a roller the position of which is fixed so that it is separated from the lower facing sheet by a small gap. This gap may advantageously be somewhat narrower than the gap which separates the resilient contacting means from the lower facing sheet, this being possible by virtue of the fact that the thickness of the foam-forming layer will be somewhat less at the position of the roller (being nearer to the point of application) than it is at the position of the resilient contacting means. The gap between the roller and the lower facing sheet should not, however, be so small that immediate contact of the upper facing sheet with the foam-forming layer occurs. The advantage of this arrangement is that the natural expension of the foam then assists the effect of the resilient contacting means by bringing the upper facing sheet and the layer together.

In one form of the invention, according to the foregoing description, the layer of foam-forming ingredients is applied to the lower facing sheet only and the upper facing sheet is brought into contact therewith at an early stage in the expansion of the foam by the resilient contacting means. In an alternative form of the invention, the foam-forming ingredients are applied as layers to both the upper and the lower facing sheets; the upper facing sheet is caused to pass first of all under a fixed roller positioned so that it affords a gap between the upper and lower facings which is slightly greater than the combined thicknesses of the two layers, and subsequently beneath the resilient contacting means whereby the opposing surfaces of the two layers are brought into uniform and complete contact with one another. In this case, the invention is of value in providing a means of avoiding the presence of internal voids in the finished laminated article.

The advantages afforded by the invention are of particular significance in the production of laminated articles of thin cross-section and low density. Existing methods for producing laminated articles generally give unsatisfactory results when cross-sections of the order of ⅛"–¼" are attempted. The accentuated tendency for void formation resulting from the use of a thin foam-forming layer in these methods can only be overcome by applying a high pressure to the laminate, before the foam is finally cured, through suitable platens and this leads to the formation of foam cores of unacceptably high density. By means of the method of the invention, void formation is prevented without the use of excessive pressure and it is possible to obtain laminates of the thickness referred to above having smooth facings, densities in the region of 2 lb./cu. ft. and excellent mechanical properties. Improved laminated articles are, however, afforded by the invention even when the foam core is of a thicker cross-section, for example 1".

A further advantage, of that form of the invention in which the upper facing sheet is brought into contact with the foam-forming layer at an early stage in the reaction of the ingredients, is that the formation of a skin on the surface of the foam layer adjacent to the upper facing sheet is largely eliminated. This skin formation is a feature of the production of laminated articles by the known methods and may give rise to deficient adhesion of the upper facing to the foam; elimination of the skin also leads to an increase of the compression strength for a given density of foam core. Methods have previously been proposed for eliminating skin formation which involve the application of an upper facing sheet to a layer of foam-forming ingredients at an early stage in the rise of the foam, but which employ non-resilient means for applying pressure to the facing sheet so as to cause it to adhere to the foam layer. Such methods give rise to the formation of a "rolling" bank of foam mixture immediately anterior to the point of application of the upper facing sheet, and consequently to the production of a foam core which is not homogeneous with respect to the "age" of the mixture of which it consists. Such lack of homogeneity can cause undesirable irregularities in the thickness of the resulting laminated article. It has been proposed to overcome this difficulty by preliminary chilling of the mixture of foam-forming ingredients, so that reaction is delayed until after the upper facing has been applied, but such a procedure is extremely inconvenient to operate. These difficulties are minimised or overcome by use of the method of the present invention.

The laminated articles with which this invention is concerned have a plastic or resinous foam core which may be formed from any suitable foam-forming composition and may be either flexible or rigid. It is particularly preferred, however, that the foam core consists of an isocyanate-based foam material. Suitable isocyanate-based foams include polyurethane foams obtained in known manner from a suitable mixture of polyurethane-forming ingredients such as polyesters or polyethers and polyisocyanates with water, catalysts, surfactants, blowing agents and other ingredients. Suitable isocyanate-based foams also include polymeric foams containing an isocyanurate ring structure which may be obtained by treating an isocyanate-polymerising catalyst, a blowing agent, and organic polyisocyanate with an isocyanate-polymerising catalyst, a blowing agent, and optionally, a deficiency, based on the isocyanate groups present, of an active hydrogen-containing compound. The facing materials may be composed of lengths or sheets of any suitable material such as, for example, paper, plastic, metal, rubber or paperboard.

The process of the present invention may conveniently be carried out in a continuous manner by means of a modified version of any of the apparatus which have been described for the continuous manufacture of such laminated articles, such as the apparatus described in the article entitled "A New Development Machine for the Continuous Lamination of Rigid Urethane Foam," which appeared in Rubber and Plastic Age, vol. 47 (1966), No. 1, p. 57. Such known apparatus comprises essentially means for imparting longitudinal motion to the upper and lower facing sheets, foam dispensing means for applying a liquid mixture of foam-forming ingredients to the surface of at least one of the said facing sheets, means for bringing the facing sheets into proximity with one another so that both sheets are in contact with the foam-forming mixture and that mixture fully occupies the space between the sheets, and means for conveying the upper and lower facing sheets simultaneously thereafter whilst formation and setting of the foam core is completed.

The modification which is required in order to adapt such as apparatus to perform the present invention consists in the provision of the resilient contacting means and, optionally, the guiding roller associated therewith. The contacting means and the roller may conveniently be combined into a single assembly which is so mounted on the apparatus as to be adjustable in longitudinal position to any point between the foam dispensing unit and the nip between the rigid rollers already referred to. The apparatus may advantageously incorporate known heating means for assisting the formation of the foam core from the layer of ingredients, such as infra-red heating elements. By virtue of the early introduction of the upper facing sheet to the foam-forming layer, it is possible to apply heat to both the upper and lower parts of the layer; in the known methods of making laminated articles this is not generally possible because of the tendency of the skin on the upper surface of the layer to cure more rapidly than the body of the layer. Accordingly, there may be used, in place of separate upper and lower heaters mounted adjacent to the laminate, a microwave tunnel heater through which the laminate is arranged to pass.

Where the apparatus used incorporates means, such as that described in the article referred to above, for folding up the edges or sides of the lower facing sheet so as to produce a tray or trough into which the mixture of foam-forming ingredients is deposited, it may be necessary to include a further modification whereby the folded edges, following application of the mixture and immediately prior to the introduction of the upper facing sheet, are temporarily displaced in an outward direction so as to permit their passage under the resilient contacting means, and roller where such is fitted. The folded edges are immediately afterwards restored to their former upright position.

By way of illustration of the invention, a description will now be given of methods and apparatus which are embodiments of the invention, with reference to the drawing accompanying the provisional specification and the accompanying drawings in which.

Figure 1:
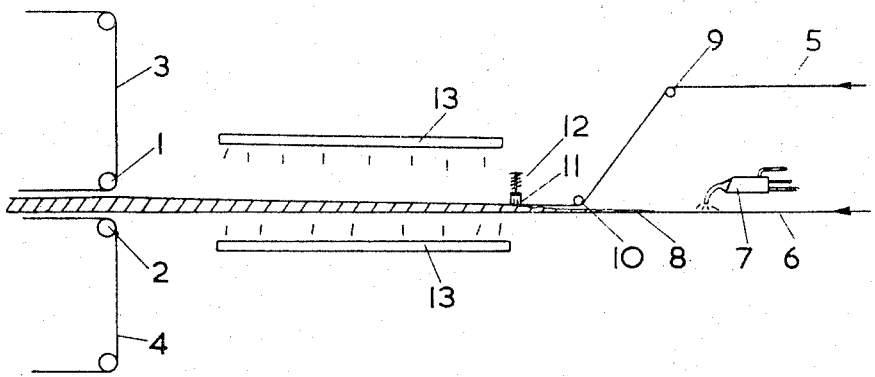
FIG. 1 is a schematic elevation of an apparatus according to the invention in which the resilient contacting means is in the form of a brush.

Referring firstly to FIG. 1 of the drawings, fixed rollers 1 and 2 which constitute the "nip" engage with continuous upper and lower conveying surfaces 3 and 4, which serve to transport the upper and lower facing sheets 5 and 6 in the direction indicated by the arrows. The facing sheets are supplied from reels (not shown). The lower facing sheet receives a layer 8 of foam-forming ingredients from a foam dispensing device 7 which is adapted to traverse to and fro across the width of the facing sheet. The upper facing sheet is transported over a guide roller 9 and under a second guide roller 10 which is mounted with a slight clearance above the lower facing sheet and the layer of foam-forming ingredients carried thereon. The upper facing sheet thereafter passes under a floating brush 11, which is capable of some degree of vertical movement and is subjected to a load by means of an adjustable spring 12. The upper facing sheet is brought into uniform contact with the foam-forming layer by means of the brush 11, and the resulting laminate passes forward, under the influence of heaters 13 which accelerate the expansion of the foam core, finally entering the nip between the rollers 1 and 2.

A suitable foam-forming composition for use in this procedure consists of the following ingredients:

| | Parts by weight |
|---|---|
| A polyoxypropylene polyether tetrol, mol. wt. approx. 450 | 100 |
| Trichloromonofluoromethane | 60 |
| Component 1: | |
| Tris-($\beta$-chloroethyl) phosphate | 30 |
| Dimethylcyclohexylamine | 2 |
| Dibutyltin dilaurate | 0.6 |
| Water | 1.0 |
| Polysiloxane/polyoxyalkylene block copolymer | 1.0 |
| Component 2: | |
| A crude diisocyanatodiphenylmethane composition | 136 |

The use of such a composition in the process of the invention affords laminates having a rigid polyurethane foam core of uniform thickness about 6 mm. and of density 2 lb./cu. ft.

Figure 2:
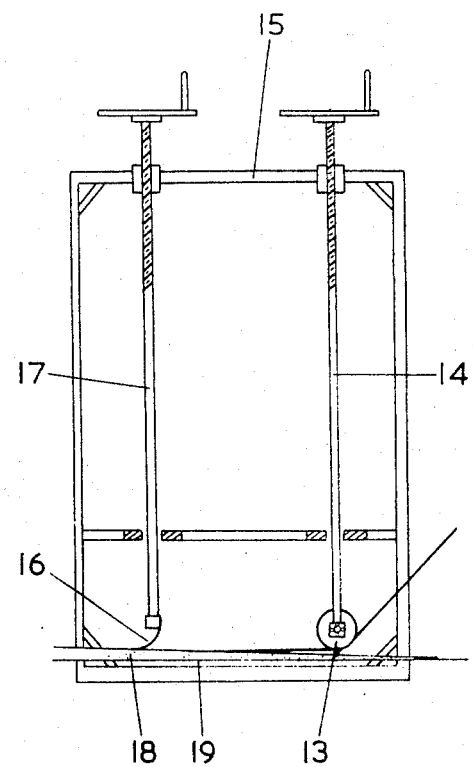
FIG. 2 is a longitudinal schematic elevation of an assembly comprising a resilient contacting means and a guiding roller which may be incorporated in a laminating apparatus of known type.
Figure 3:
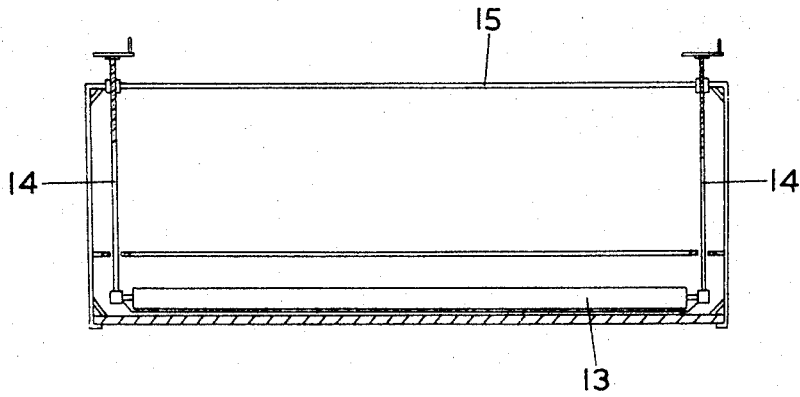
FIG. 3 is a transverse view of the assembly shown in FIG. 2.

Referring now to FIGS. 2 and 3 of the drawings, these illustrate in more detail the use of an alternative form of resilient contacting means, namely a spring steel blade. A guiding roller 13 of a width at least equal to that of the laminate to be produced is rotatably supported at each end by rods 14 which are mounted for screw adjustment in a frame 15. A curved spring steel blade 16 of thickness 0.01", depth 4", and of the same width as the roller 13 is supported at each end upon rods 17 which are also mounted for screw adjustment in the frame 15. The horizontal distance between the roller and the blade is about 25". The frame 15 is secured to the base plate of the foam laminating machine in a position forward of the point of application of a layer of a mixture of foam-forming ingredients 18 to the lower facing sheet 19, and the respective heights of the roller 13 and the blade 16 are adjusted so that the upper facing sheet 20 passes under the roller 13 just clear of the layer 18 and is then brought into contact with the upper surface of the layer, as this expands, by the action of passing under the blade 16; the position of the blade is such that it applies the maximum pressure onto the laminate which can be tolerated without formation of a bank of foam mixture behind the blade.

What is claimed is:

1. In a process for the continuous manufacture of laminated articles consisting of a core of plastic or resinous foam sandwiched between and bonded to two outer sheets of facing material, the process comprising imparting longitudinal motion to upper and lower facing sheets, applying to the surface of at least one of the said facing sheets whilst it is in motion a liquid mixture of foam-forming ingredients, bringing the upper facing sheet, before the rise of the foam-forming mixture has proceeded to any substantial extent, into proximate relationship with the lower sheet such that both sheets are in contact with the foam-forming mixture and that mixture fully occupies the space between the said sheets, the improvement which comprises bringing the upper sheet into the said proximate relationship through the agency of spring mounted resilient contacting means whereby uniform pressure is applied through the upper facing sheet to the layer of foam-forming ingredients over the entire width of the layer before the rise of the foam-forming mixture is complete, and thereafter simultaneously transporting the upper and lower facing sheets whilst formation, including substantial rising, and setting of the foam core between them are completed.

2. A process as claimed in claim 1, wherein the resilient contacting means is a roller covered with a resilient material such as a flexible plastic foam, which is mounted parallel to the lower facing sheet and under which the upper facing sheet is caused to pass.

3. A process as claimed in claim 1, wherein the resilient contacting means is a floating brush which bears against the upper surface of the upper facing sheet.

4. A process as claimed in claim 1, wherein the resilient contacting means comprises at least one resilient metal strip which is mounted transversely to the line of motion of the upper facing sheet in such a way that its lower edge bears against the upper surface of the said sheet.

5. A process as claimed in claim 4, wherein the resilient metal strip is curved so that its lower part makes tangential contact with the upper facing sheet.

6. A process as claimed in claim 4, wherein the resilient metal strip is composed of spring steel strip of thickness in the range 0.005″–0.02″.

7. A process as claimed in claim 1, wherein the resilient contacting means is of such shape and dimensions that the uniform pressure which it exerts upon the upper facing sheet and the layer of foam-forming ingredients is distributed over an appreciable area of the said sheet and layer.

8. A process as claimed in claim 1, wherein the upper facing sheet is brought into the aforesaid proximate relationship with the lower facing sheet by the resilient contacting means at a stage when the foam-forming reaction has proceeded to an extent such that the layer has expanded to only a small fraction of its total rise.

9. A process as claimed in claim 1, wherein the upper facing sheet is caused to pass, prior to its passage beneath the resilient contacting means, under a fixed roller which is separated from the lower facing sheet by a distance somewhat greater than the thickness of the foam-forming layer at that point.

10. A process as claimed in claim 8, wherein the layer of foam-forming ingredients is applied to the lower facing sheet only and the upper facing sheet is brought into contact therewith by the resilient contacting means at a stage when the layer has expanded to only a small fraction of its total rise.

11. In an apparatus for the manufacture of laminated articles consisting of a core of plastic or resinous foam sandwiched between and bonded to two outer sheets of facing material, said apparatus including means for imparting longitudinal motion to the upper and lower facing sheets, and foam dispensing means for applying a liquid mixture of foam-forming ingredients to the surface of at least one of the said facing sheets whilst the sheet is in motion, the improvement comprising spring mounted resilient contacting means, positioned in close proximity to said dispensing means, for bringing the upper facing sheet, before the rise of the applied foam-forming mixture has occurred to any substantial extent, into proximate relationship with the lower facing sheet such that both sheets are in contact with the foam-forming mixture and that mixture fully occupies the space between the sheets, the said contacting means applying uniform pressure through the upper facing sheet to the layer of foam-forming ingredients over the entire width of the layer, and means for simultaneously thereafter transporting the upper and lower facing sheets whilst formation, including substantial rising, and setting of the foam core between them are completed.

12. Apparatus as claimed in claim 11, wherein the resilient contacting means is a roller covered with a resilient material such as a flexible plastic foam, which is mounted parallel to the lower facing sheet and under which the upper facing sheet is caused to pass.

13. Apparatus as claimed in claim 11, wherein the resilient contacting means is a floating brush which bears against the upper surface of the upper facing sheet.

14. Apparatus as claimed in claim 11, wherein the resilient contacting means comprises at least one resilient metal strip which is mounted transversely to the line of motion of the upper facing sheet in such a way that its lower edge bears against the upper surface of the said sheet.

15. Apparatus as claimed in claim 14, wherein the resilient metal strip is curved so that its lower part makes tangential contact with the upper facing sheet.

16. Apparatus as claimed in claim 14, wherein the resilient metal strip is composed of spring steel strip of thickness in the range 0.005–0.02″.

17. Apparatus as claimed in claim 11, wherein the resilient contacting means is of such shape and dimensions that the uniform pressure which it exerts upon the upper facing sheet and the layer of foam-forming ingredients is distributed over an appreciable area of the said sheet and layer.

18. Apparatus as claimed in claim 11, wherein there is additionally incorporated a fixed roller under which the upper facing sheet is caused to pass prior to its passage beneath the resilient contacting means, the said roller being separated from the lower facing sheet by a distance somewhat greater than the thickness of the foam-forming layer at that point.

19. Apparatus as claimed in claim 18, wherein the resilient contacting means and the roller are independently adjustable in respect of their separation from the lower facing sheet.

References Cited
UNITED STATES PATENTS

| | | | |
|---|---|---|---|
| 2,956,310 | 10/1960 | Roop et al. | 156—79 X |
| 2,962,407 | 11/1960 | Aykanian | 156—78 X |
| 3,037,897 | 6/1962 | Pelley | 156—78 |
| 3,047,449 | 7/1962 | Coble | 156—79 X |
| 3,443,007 | 5/1969 | Hardy | 156—78 X |

CARL D. QUARFORTH, Primary Examiner

S. R. HELLMAN, Assistant Examiner

U.S. Cl. X.R.

156—501